US012145630B2

(12) United States Patent
Kim (10) Patent No.: US 12,145,630 B2
(45) Date of Patent: Nov. 19, 2024

(54) AUTONOMOUS VEHICLE, CONTROL SYSTEM FOR REMOTELY CONTROLLING THE SAME, AND METHOD THEREOF

(71) Applicants: Hyundai Motor Company, Seoul (KR); Kia Corporation, Seoul (KR)

(72) Inventor: Dong Hyuk Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 254 days.

(21) Appl. No.: 17/851,114

(22) Filed: Jun. 28, 2022

(65) Prior Publication Data

US 2023/0133213 A1  May 4, 2023

(30) Foreign Application Priority Data

Nov. 3, 2021 (KR) .......... 10-2021-0150020

(51) Int. Cl.
*B60W 60/00* (2020.01)
*B60W 30/06* (2006.01)
*B60W 40/04* (2006.01)

(52) U.S. Cl.
CPC ........ *B60W 60/0059* (2020.02); *B60W 30/06* (2013.01); *B60W 40/04* (2013.01); *B60W 60/0015* (2020.02); *B60W 2556/10* (2020.02)

(58) Field of Classification Search
CPC ..... G05D 1/0287; B60W 40/04; B60W 30/06
USPC .......................................................... 701/41
See application file for complete search history.

(56) References Cited

U.S. PATENT DOCUMENTS

| 10,922,903 | B2 | 2/2021 | Dolgov et al. | |
| 2019/0196465 | A1* | 6/2019 | Hummelshøj | .... B60W 60/0015 |
| 2019/0308616 | A1* | 10/2019 | Jie | ..... B60W 50/0097 |
| 2020/0017100 | A1* | 1/2020 | Wilding | ......... G08G 1/143 |

* cited by examiner

*Primary Examiner* — Todd Melton
*Assistant Examiner* — Vincent Feng
(74) *Attorney, Agent, or Firm* — Fox Rothschild LLP (57) ABSTRACT

An autonomous vehicle, a control system for remotely controlling the same, and a method thereof are provided. In one aspect, an autonomous vehicle is provided that includes: an autonomous driving control apparatus configured to include a processor that enters a surrounding vehicle monitoring mode when an autonomous vehicle temporarily parking, selects a surrounding vehicle that is likely to be prevented from exiting by the autonomous vehicle as a target vehicle to be monitored, and temporarily moves the autonomous vehicle through autonomous driving control or remote driving control to secure an exit space for the target vehicle to be monitored when it exits.

20 Claims, 10 Drawing Sheets

RADAR: 5EA, CAMERA: 6EA, LIDAR: 6EA (+1EA), GPS

AUTONOMOUS VEHICLE, CONTROL SYSTEM FOR REMOTELY CONTROLLING THE SAME, AND METHOD THEREOF

CROSS-REFERENCE TO RELATED APPLICATION

This application claims priority to and benefits of Korean Patent Application No. 10-2021-0150020, filed in the Korean Intellectual Property Office on Nov. 3, 2021, the entire contents of which are incorporated herein by reference.

BACKGROUND

(a) Field of the Invention

The present disclosure relates to an autonomous vehicle, a control system for remotely controlling the same, and a method thereof, and more particularly, to double parking of an autonomous vehicle and remote control after the double parking.

(b) Background

As an electronic technique of a vehicle develops, an interest in an autonomous vehicle that drives to a destination by recognizing a driving environment of the vehicle itself without manipulation of a driver is growing more and more.

An autonomous vehicle refers to a vehicle capable of operating by itself without manipulation of a driver or a passenger. Such an autonomous vehicle supports not only autonomous driving but also autonomous parking control.

When parking in places with severe parking difficulties, there are often situations in which double parking or temporary parking is required due to a lack of parking space. However, conventional autonomous vehicles do not support such double parking, so when there is a lack of parking space, there is a problem in that time and energy consumption for parking is large, such as continuously searching for a parking space or wandering around a parking lot despite existence of a double parking space.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure has been made in an effort to provide an autonomous vehicle, a control system for remotely controlling the same, and a method thereof, capable of controlling it to perform temporary parking (e.g., double parking, parking in a temporary parking lot, etc.) when there is insufficient parking space for autonomous vehicles.

In addition, an exemplary embodiment of the present disclosure exemplary embodiment of the present disclosure has been made in an effort to provide an autonomous vehicle, a control system for remotely controlling the same, and a method thereof, capable of performing remote control or autonomous driving control such that a previously parked surrounding vehicle can exit by monitoring surrounding vehicles that have already been parked while an autonomous vehicle is double-parked.

The technical objects of the present disclosure are not limited to the objects mentioned above, and other technical objects not mentioned can be clearly understood by those skilled in the art from the description of the claims.

An exemplary embodiment of the present disclosure provides an autonomous vehicle, comprising or including: an autonomous driving control apparatus configured to include a processor that enters a surrounding vehicle monitoring mode when an autonomous vehicle temporarily parking, selects a surrounding vehicle that is likely to be prevented from exiting by the autonomous vehicle as a target vehicle to be monitored, and temporarily moves the autonomous vehicle through autonomous driving control or remote driving control to secure an exit space for the target vehicle to be monitored when it exits.

In an exemplary embodiment, the processor may determine whether temporary parking is required when arriving at a destination.

In an exemplary embodiment, the processor may perform the temporary parking at a parking position received from a control system when the temporary parking is required.

In an exemplary embodiment, the processor, when entering the surrounding vehicle monitoring mode, may determine that temporary movement of the autonomous vehicle is necessary for the target vehicle to be monitored to exit, at least one or more of cases in which the target vehicle to be monitored is moving, a kind of door of the target vehicle to be monitored is opened, a change in a kind of lamp of the target vehicle to be monitored occurs, ignition of the target vehicle to be monitored is turned on, and notification of movement of the target vehicle to be monitored is received from the control system.

In an exemplary embodiment, the processor suitably may temporarily move the autonomous vehicle in an autonomous driving mode, at least one or more of cases in which the autonomous vehicle is temporarily moved by forward or reverse control, an exit space for the target vehicle to be monitored is securable with one movement, a section in which the autonomous vehicle is temporarily moved has no driving history in a reverse direction, and there is no risk of collision in the section where the vehicle is temporarily moved.

In an exemplary embodiment, the processor suitably may request remote driving control to a control system for temporary movement of the autonomous vehicle.

In an exemplary embodiment, the temporary parking suitably may include parking in a temporary parking lot, or parking that obstructs exit of surrounding vehicles even when parked in a general parking lot.

An exemplary embodiment of the present disclosure provides a control system including a processor configured to select a parking position for minimizing remote control for parking to transfer it to an autonomous vehicle when the autonomous vehicle arrives at a destination, and to perform remote control from the autonomous vehicle when receiving a request for parking control through remote control from the autonomous vehicle.

In an exemplary embodiment, the processor suitably may determine whether temporary parking of the autonomous vehicle is required.

In an exemplary embodiment, the processor suitably may search for a parking history based on a database and preferentially selects a regular parking position when the autonomous vehicle is temporarily parked.

In an exemplary embodiment, the processor suitably may preferentially select a position where the autonomous vehicle is movable in an autonomous driving mode without remote control as a parking position.

In an exemplary embodiment, the processor suitably may determine that temporary movement of the autonomous vehicle is necessary for the target vehicle to be monitored to exit, at least one or more of cases in which the target vehicle to be monitored is moving, a kind of door of the target vehicle to be monitored is opened, a change in a kind of lamp of the target vehicle to be monitored occurs, ignition of the target vehicle to be monitored is turned on, and notification of movement of the target vehicle to be monitored is received from the control system.

In an exemplary embodiment, the processor suitably may preferentially select a position with a minimum number of surrounding vehicles that are prevented from exiting by the autonomous vehicle as a parking position.

In an exemplary embodiment, the processor suitably may monitor movement of vehicles surrounding the autonomous vehicle after the autonomous vehicle is temporarily parked, and when movement information of the vehicles surrounding the autonomous vehicle is detected, transmits it to the autonomous vehicle.

An exemplary embodiment of the present disclosure provides a remote control method for an autonomous vehicle, including: entering a surrounding vehicle monitoring mode when an autonomous vehicle is temporarily parked; selecting a surrounding vehicle that is likely to be prevented from exiting by the autonomous vehicle as a target vehicle to be monitored; and securing an exit space for the target vehicle to be monitored by temporarily moving the autonomous vehicle through autonomous driving control or remote driving control when it exits.

In an exemplary embodiment, it may further include receiving a parking position from a control system and performing temporary parking at the parking position when the autonomous vehicle is temporarily parked.

In an exemplary embodiment, the securing of the exit space for the target vehicle to be monitored includes when entering the surrounding vehicle monitoring mode, determining that temporary movement of the autonomous vehicle is necessary for the target vehicle to be monitored to exit, at least one or more of cases in which the target vehicle to be monitored is moving, a kind of door of the target vehicle to be monitored is opened, a change in a kind of lamp of the target vehicle to be monitored occurs, ignition of the target vehicle to be monitored is turned on, and notification of movement of the target vehicle to be monitored is received from the control system.

In an exemplary embodiment, the securing of the exit space for the target vehicle to be monitored may include temporarily moving the autonomous vehicle in an autonomous driving mode, at least one or more of cases in which the autonomous vehicle is temporarily moved by forward or reverse control, an exit space for the target vehicle to be monitored is securable with one movement, a section in which the autonomous vehicle is temporarily moved has no driving history in a reverse direction, and there is no risk of collision in the section where the vehicle is temporarily moved.

In an exemplary embodiment, the securing of the exit space for the target vehicle to be monitored may include requesting remote driving control to the control system for temporary movement of the autonomous vehicle; and receiving a remote driving command and a remote driving path from the control system to perform following and control.

In an exemplary embodiment, the temporary parking may include parking in a temporary parking lot, or parking that obstructs exit of surrounding vehicles even when parked in a general parking lot. According to the present technique, it is possible to improve the commercialization of autonomous driving by controlling it to perform temporary parking (e.g., double parking, parking in a temporary parking lot, etc.) when there is insufficient parking space for autonomous vehicles and performing remote control or autonomous driving control such that a previously parked surrounding vehicle can exit by monitoring surrounding vehicles that have already been parked while an autonomous vehicle is double-parked.

In addition, various effects that can be directly or indirectly identified through this document may be provided.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human diver is required to continue paying attention to the driving environment throughout the journey, while also performing the remainder of the necessary tasks.

In certain aspects, the present systems and vehicles may be fully autonomous. In other certain aspects, the present systems and vehicles may be semi-autonomous.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 7.

Figure 1:
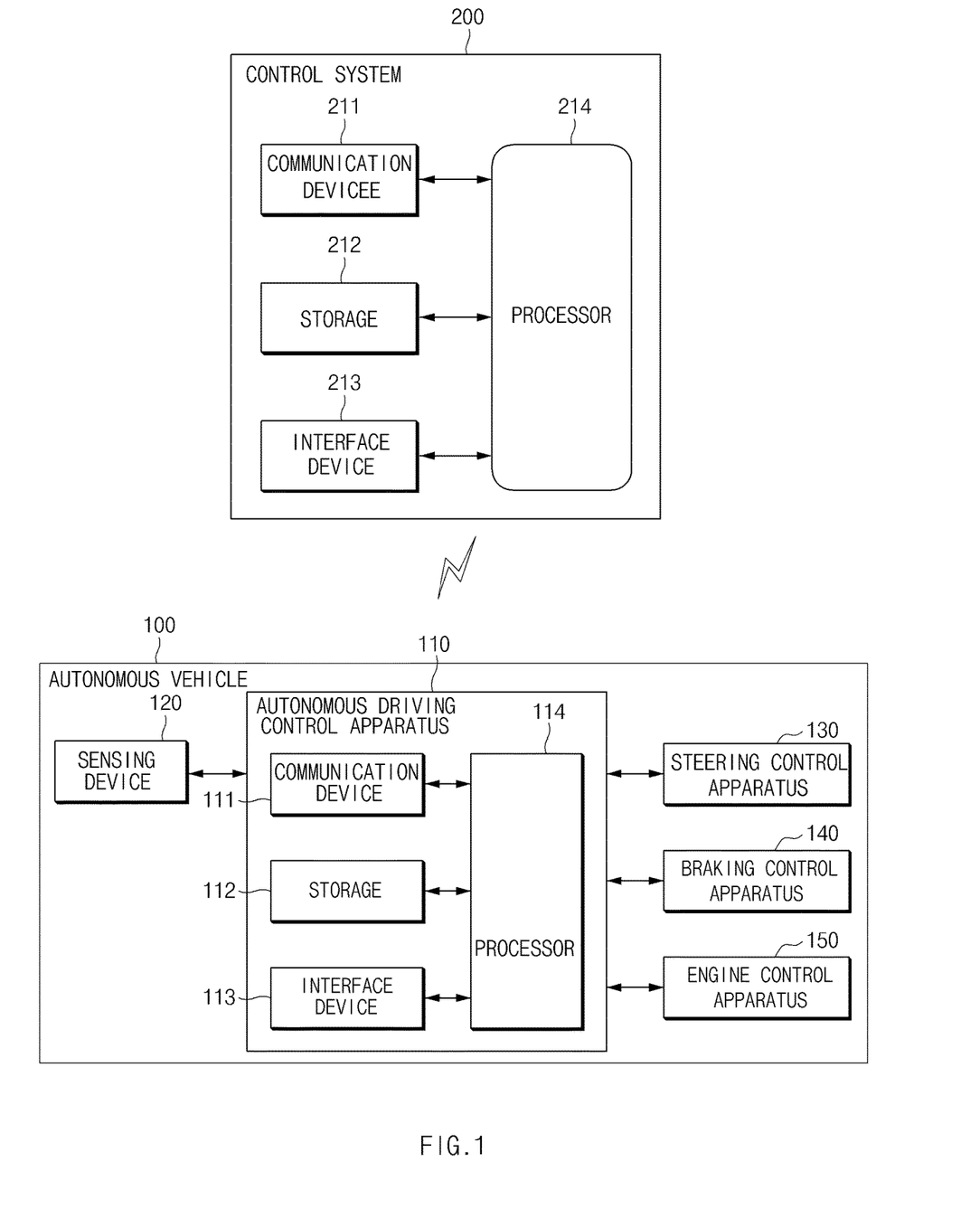
FIG. 1 illustrates a block diagram showing a configuration of a system for remotely controlling an autonomous vehicle according to an exemplary embodiment of the present disclosure.

FIG. 1 illustrates a block diagram showing a configuration of a system for remotely controlling an autonomous vehicle according to an exemplary embodiment of the present disclosure.

Referring to FIG. 1, the remote control system for an autonomous vehicle according to an exemplary embodiment of the present disclosure includes an autonomous vehicle 100 and a control system 200, and remote control may be performed through communication between the autonomous vehicle 100 and the control system 200. In this case, the autonomous vehicle 100 may include a vehicle that autonomously drives regardless of presence of an occupant.

The autonomous vehicle 100 may include an autonomous driving control apparatus 120, a sensing device 120, a steering control apparatus 130, a braking control apparatus 140, and an engine control apparatus 150.

The autonomous driving control apparatus 110 according to the exemplary embodiment of the present disclosure may be implemented inside the vehicle. In this case, the autonomous driving control apparatus 110 may be integrally formed with internal control units of the vehicle, or may be implemented as a separate device to be connected to control units of the vehicle by a separate connection means.

The autonomous driving control apparatus 110 may enter a surrounding vehicle monitoring mode when the autonomous vehicle temporarily parking, may select a surrounding vehicle that is likely to be prevented from exiting by the autonomous vehicle as a target vehicle to be monitored, and may temporarily move the autonomous vehicle through autonomous driving control or remote driving control to secure an exit space for the target vehicle to be monitored when it exits.

Such temporary parking includes parking in a temporary parking lot, or parking that obstructs exit of surrounding vehicles even when parked in a general parking lot.

Referring to FIG. 1, the autonomous driving control apparatus 110 may include a communication device 111, a storage 112, an interface device 113, and a processor 114.

The communication device 111 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like.

In addition, the communication device 111 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), Ethernet communication, etc. In addition, short-range communication technique may include bluetooth, ZigBee, ultra wideband (UWB), radio frequency identification (RFID), infrared data association (IrDA), and the like. For example, the communication device 111 may perform wireless communication with the control system 200, may transmit vehicle position information (e.g., vehicle coordinates), surrounding information (e.g., obstacle information), vehicle information (e.g., vehicle interior and exterior image data, etc.), a remote control request, etc. to the control system 200, and may receive a remote driving path, a remote driving control command, and the like from the control system 200.

The storage 112 may store sensing results of the sensing device 120, information received from the control system 200, data and/or algorithms required for the processor 114 to operate, and the like. As an example, the storage 112 may store a vehicle information, image data photographed through a camera, surrounding vehicle monitoring information, and the like. In addition, the storage 112 may store a remote control command received from the control system 200, surrounding vehicle movement information, DB-based parking position information, and the like.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input means for receiving a control command from a user and an output means for outputting an operation state of the autonomous driving control apparatus 110 and results thereof. Herein, the input means may include a key button, and may further include a mouse, a keyboard, a touch screen, a microphone, a joystick, a jog shuttle, a stylus pen, and the like. In addition, the input means may further include a soft key implemented on the display.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated. For example, the output device may output a current situation of the autonomous vehicle 100, such as an autonomous driving impossible situation, an autonomous driving re-start situation, a remote driving control situation, and the like.

In this case, the display may include at least one or more a liquid crystal display (LCD), a thin film transistor liquid crystal display (TFT LCD), an organic light emitting diode display (OLED display), a flexible display, a field emission display (FED), or a 3D display.

As an example, the interface device 113 may be implemented as a head-up display (HUD), a cluster, an audio video navigation (AVN), a human machine interface (HM), a user setting menu (USM), or the like.

The processor 114 may be electrically connected to the communication device 111, the storage 112, the interface device 113, and the like, may electrically control each component, and may be an electrical circuit that executes software commands, thereby performing various data processing and calculations described below.

The processor 114 may process a signal transferred between components of the autonomous driving control apparatus 110, and may perform overall control such that each of the components can perform its function normally.

The processor 114 may be implemented in the form of hardware, software, or a combination of hardware and software, or may be implemented as microprocessor, and may be, e.g., an electronic control unit (ECU), a micro controller unit (MCU), or other subcontrollers mounted in the vehicle.

The process 114 may enter a surrounding vehicle monitoring mode when the autonomous vehicle temporarily parking, may select a surrounding vehicle that is likely to be prevented from exiting by the autonomous vehicle as a target vehicle to be monitored, and may temporarily move the autonomous vehicle through autonomous driving control or remote driving control to secure an exit space for the target vehicle to be monitored when it exits.

When arriving at a destination, the processor 114 may determine whether temporary parking is required. That is, when there is no parking space in a general parking lot, the processor 114 may determine that parking in a temporary parking lot or temporary double parking is required.

The processor 114 may perform temporary parking at a parking position received from the control system 200 when the temporary parking is required.

When entering the surrounding vehicle monitoring mode, the processor 114 may determine that temporary movement of the autonomous vehicle (autonomous vehicle 100) is necessary for the target vehicle to be monitored to exit, at least one or more of the cases in which the target vehicle to be monitored is moving, a kind of door of the target vehicle to be monitored is opened, a change in a kind of lamp of the target vehicle to be monitored occurs, ignition of the target vehicle to be monitored is turned on, and notification of movement of the target vehicle to be monitored is received from the control system 200.

The processor 114 may temporarily move the autonomous vehicle in the autonomous driving mode, at least one or more of the cases in which the autonomous vehicle is temporarily moved by forward or reverse control, an exit space for the target vehicle to be monitored can be secured with one movement, a section in which the autonomous vehicle is temporarily moved has no driving history in the reverse direction, and there is no risk of collision in the section where the vehicle is temporarily moved. The processor 114 may temporarily move the autonomous vehicle by requesting the remote driving control to the control system 200 except in the above-described cases.

The sensing device 120 may detect an obstacle positioned around the vehicle, e.g., a nearby parked vehicle, and may include at least one or more sensors that measure movement of the corresponding obstacle (e.g., movement, change of kinds of lamps, ignition-on, whether a door is opened, whether a tailgate is opened, etc.). Accordingly, the sensing device 120 may sense opening of a door of a previously parked vehicle, a boarding motion of a person, movement of a previously parked vehicle, a sound of starting-up of a previously parked vehicle, and the like.

To this end, the sensing device 120 may include an ultrasonic sensor, a radar, a camera (inside and outside the vehicle), a laser scanner and/or a corner radar, a lidar, an acceleration sensor, a microphone, and the like.

Figure 2A:
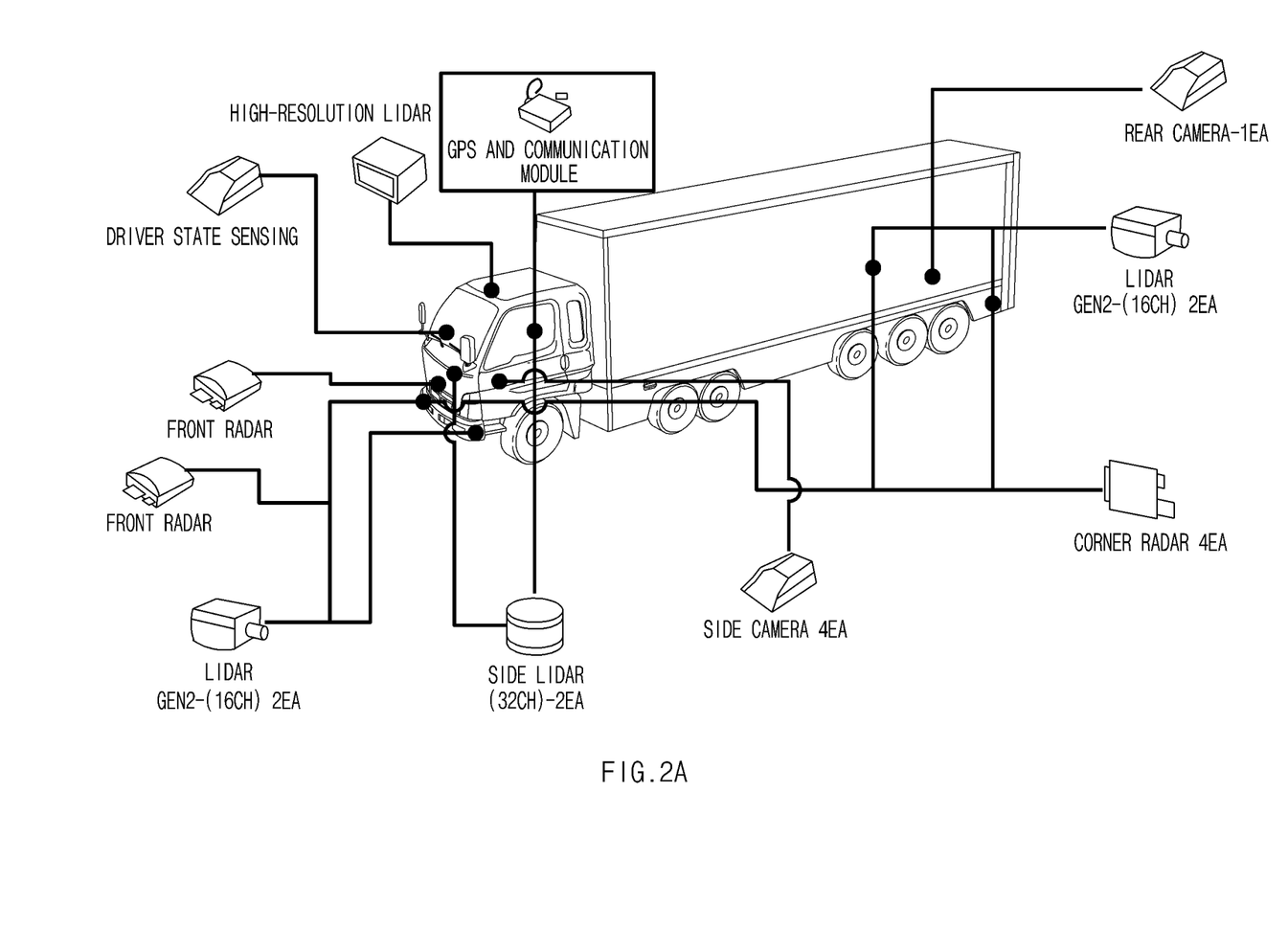
FIG. 2A illustrates a view for describing a sensing device of an autonomous vehicle according to an exemplary embodiment of the present disclosure.
Figure 2B:
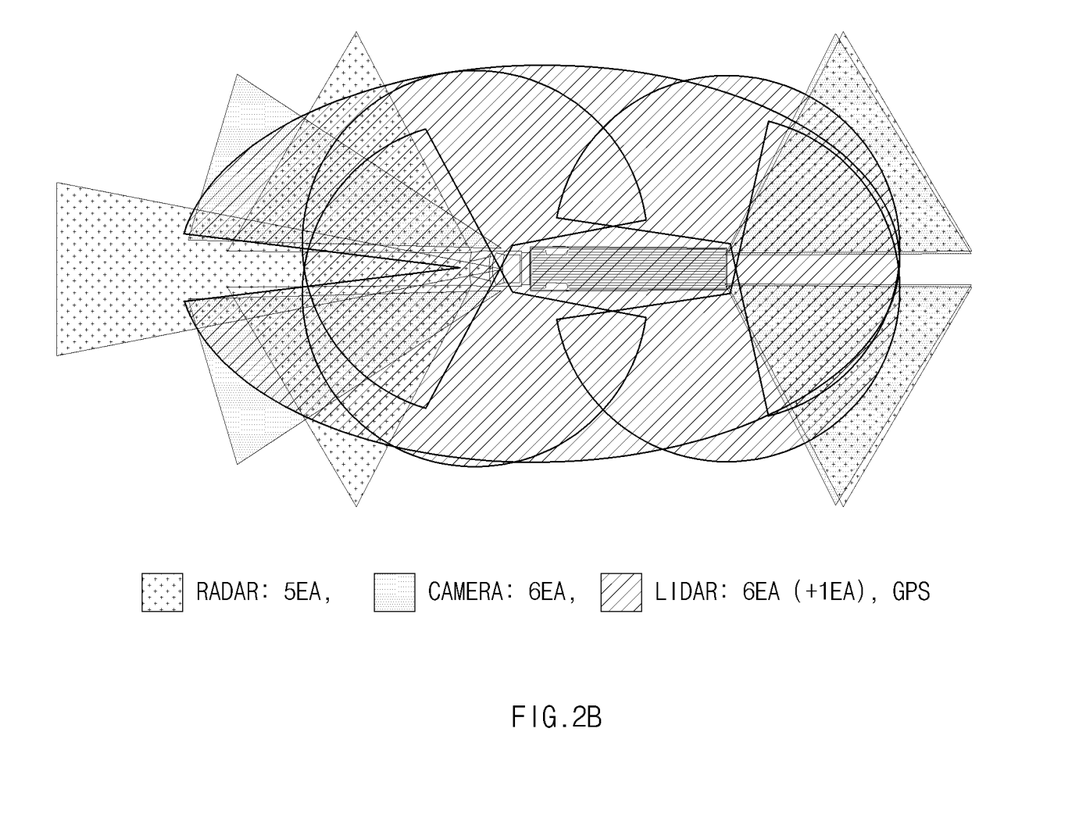
FIG. 2B illustrates a sensing range of a sensing device of an autonomous vehicle according to an exemplary embodiment of the present disclosure.

FIG. 2A illustrates a view for describing a sensing device of an autonomous vehicle according to an exemplary embodiment of the present disclosure, and FIG. 2B illustrates a sensing range of a sensing device of an autonomous vehicle according to an exemplary embodiment of the present disclosure.

Referring to FIG. 2A, the sensing device 120 may include a front radar mounted on the front of the vehicle, a lidar, a side lidar, a side camera, a corner radar, a high-resolution lidar, a rear camera, a rear lidar, etc. In addition, referring to FIG. 2B, a surrounding situation may be detected through radars, cameras, and lidars of the front, rear, and side of the vehicle.

The steering control device 130 may be configured to control a steering angle of a vehicle, and may include a steering wheel, an actuator interlocked with the steering wheel, and a controller controlling the actuator.

The braking control device 140 may be configured to control braking of the vehicle, and may include a controller that controls a brake thereof.

The engine control device 150 may be configured to control engine driving of a vehicle, and may include a controller that controls a speed of the vehicle.

The control system 200 may select a parking position for minimizing remote control for parking to transfer it to the autonomous vehicle 100 when the autonomous vehicle 100 arrives at a destination, and may perform remote control from the autonomous vehicle 100 when receiving a request for parking control through remote control from the autonomous vehicle 100.

The control system 200 may include a communication device 211, a storage 212, an interface device 213, and a processor 214.

The communication device 211 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like.

In addition, the communication device 211 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like. For example, the communication device 211 may perform wireless communication with the autonomous vehicle 100. For example, the communication device 211 may communicate with a previously parked surrounding vehicle of the autonomous vehicle 100, and may communicate with an infrastructure such as a CCTV monitoring a previously parked surrounding vehicle.

The storage 212 may store information received from the autonomous vehicle 100, and data and/or algorithm required for the processor 214 to operate, and the like. As an example, the storage 212 may store vehicle position information received from the autonomous vehicle 100, etc.

The storage 212 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 213 may include an input means capable of receiving a control command from an operator and an output means for outputting an operation state of the control system 200 and results thereof. Herein, the input means may include a key button, and may further include a mouse, a keyboard, a touch screen, a microphone, a joystick, a jog shuttle, a stylus pen, and the like. In addition, the input means may further include a soft key implemented on the display. For example, the interface device 213 may display a remote driving control situation, and may receive a remote driving control command from an operator. In addition, the interface device 213 may include all communication terminals such as a personal computer (PC), a notebook computer, a smartphone, a tablet PC, a pad, a personal digital assistant (PDA), and a wearable device.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one or more a liquid crystal display (LCD), a thin film transistor liquid crystal display (TFT LCD), an organic light emitting diode display (OLED display), a flexible display, a field emission display (FED), or a 3D display.

The processor 214 may be electrically connected to the communication device 211, the storage 212, the interface device 213, and the like, may electrically control each component, and may be an electrical circuit that executes software commands, thereby performing various data processing and calculations described below.

The processor 214 may process a signal transferred between components of the control system 200, and may perform overall control such that each of the components can perform its function normally. The processor 214 may be implemented in the form of hardware, software, or a combination of hardware and software, or may be implemented as microprocessor.

The processor 214 may determine whether temporary parking of the autonomous vehicle 100 is necessary, and when the autonomous vehicle 100 is temporarily parked, may search for a parking history based on database and may preferentially select a regularly parked position.

In addition, the processor 214 may preferentially select a position where the autonomous vehicle 100 can move in an autonomous driving mode without remote control as the parking position.

The processor 214 may determine that the autonomous vehicle 100 can move in an autonomous driving mode without remote control at least one or more of the cases where it is possible to secure an exit space for a vehicle surrounding the autonomous vehicle by forward or backward control of the autonomous vehicle 100, it is possible to secure an exit space for a vehicle surrounding the autonomous vehicle 100 with one movement of the autonomous vehicle 100, and there is no risk of an accident in a moving section of the autonomous vehicle 100.

The processor 214 may preferentially select a position with a minimum number of surrounding vehicles that are prevented from exiting by the autonomous vehicle as a parking position.

After the autonomous vehicle is temporarily parked, the processor 214 may monitor movement of vehicles surrounding the autonomous vehicle 100, and when movement information of the vehicles surrounding the autonomous vehicle 100 is detected, may transmit it to the autonomous vehicle 100.

Figure 3A:
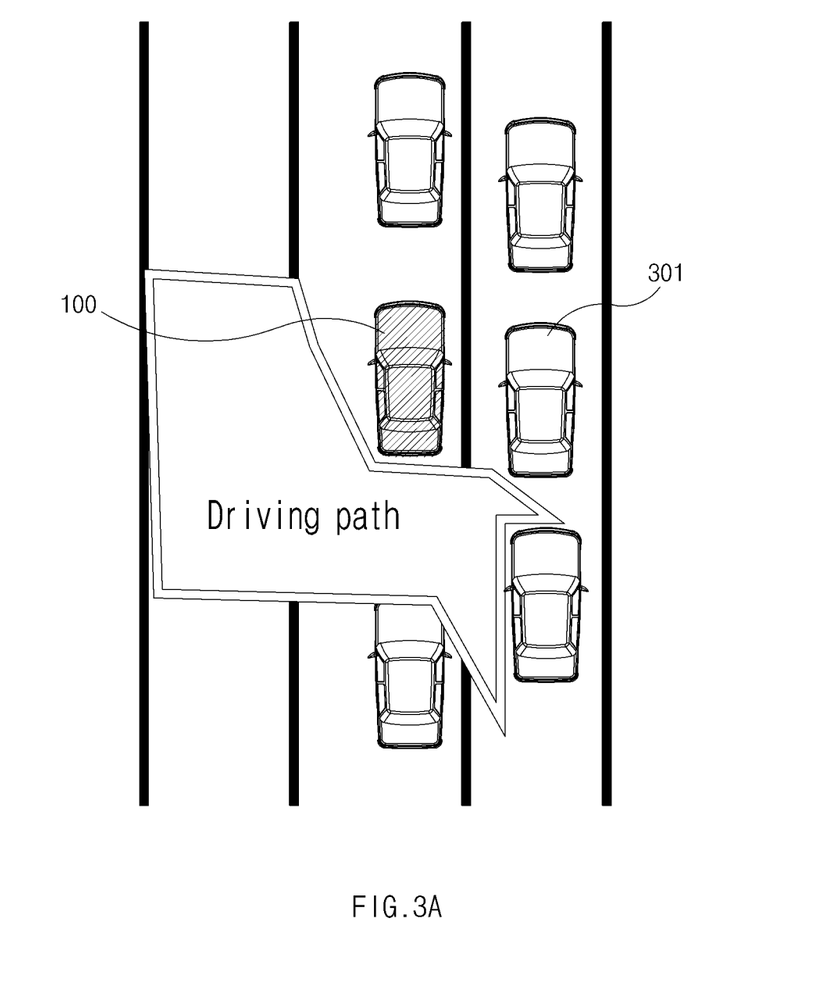
FIG. 3A illustrates an example of obstructing exit of one surrounding vehicle during double parking according to an exemplary embodiment of the present disclosure.
Figure 3B:
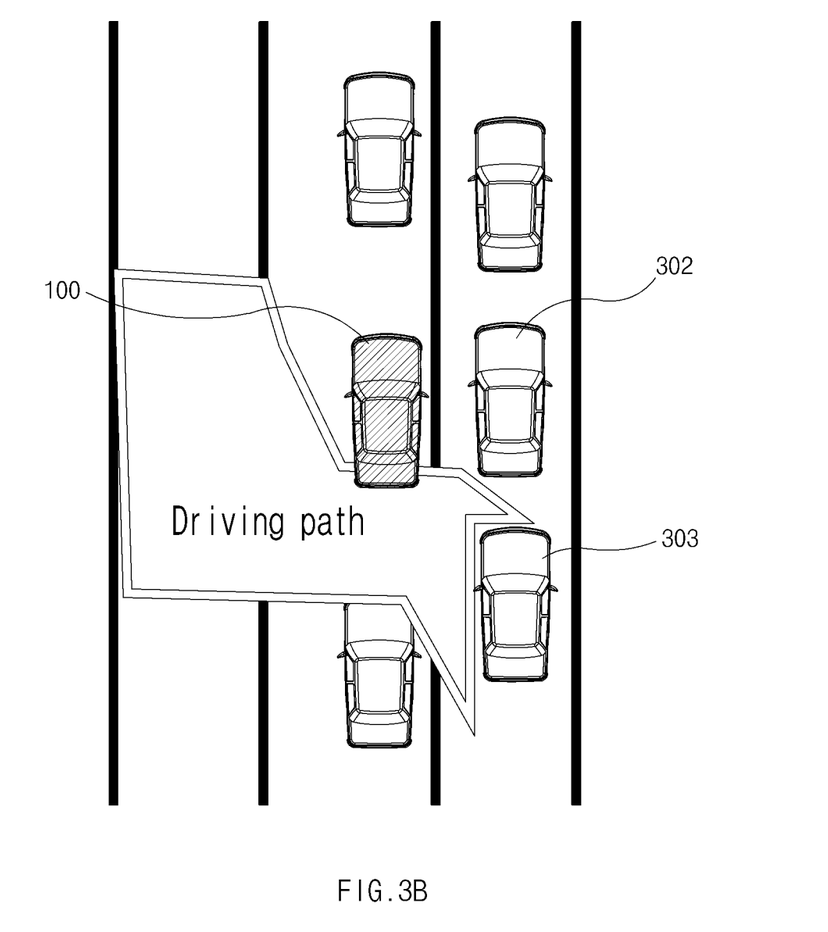
FIG. 3B illustrates an example of obstructing exit of two surrounding vehicles during double parking according to an exemplary embodiment of the present disclosure.

FIG. 3A illustrates an example of obstructing exit of one surrounding vehicle during double parking according to an exemplary embodiment of the present disclosure, and FIG. 3B illustrates an example of obstructing exit of two surrounding vehicles during double parking according to an exemplary embodiment of the present disclosure.

When the autonomous vehicle 100 is double-parked as shown in FIG. 3A, a vehicle 301 among previously parked surrounding vehicles is disturbed when it exits. When the autonomous vehicle 100 is double-parked as illustrated in FIG. 3B, vehicles 302 and 303 among the previously parked surrounding vehicles are disturbed when they exit.

Figure 4A:
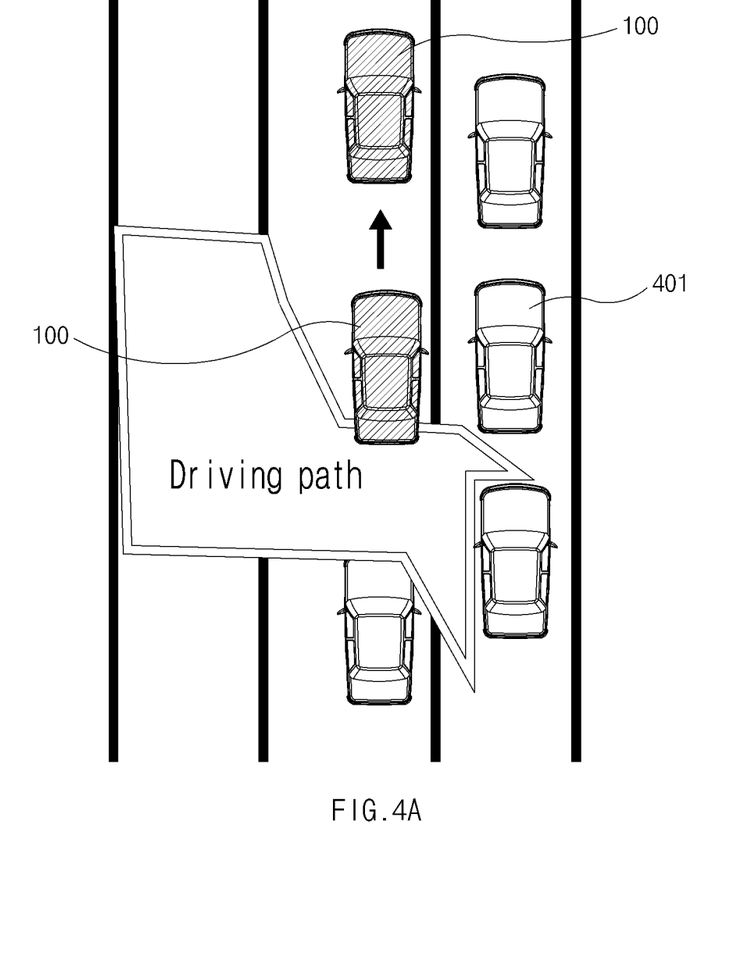
FIG. 4A illustrates an example of controlling an autonomous vehicle such that a surround vehicle can exit in a forward or reverse direction without excessive steering control during double parking according to an exemplary embodiment of the present disclosure.

FIG. 4A illustrates an example of controlling an autonomous vehicle such that a surround vehicle can exit in a forward or reverse direction without excessive steering control during double parking according to an exemplary embodiment of the present disclosure.

Referring to FIG. 4A, when the autonomous vehicle 100 is blocking exiting of a surrounding vehicle 401, the autonomous vehicle 100 may be forwardly moved to create a space for the surrounding vehicle 401 to exit. In this case, the surrounding vehicle 401 may be allowed to exit by only straightly controlling the autonomous vehicle 100 without steering control, and thus the autonomous vehicle 100 be straightly controlled through autonomous driving control without remote driving control.

Figure 4B:
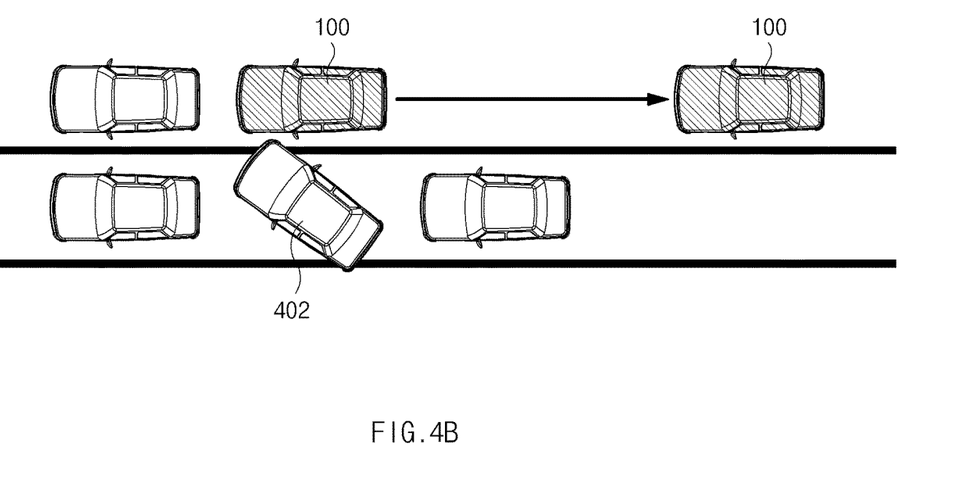
FIG. 4B illustrates an example of enabling a surrounding vehicle to exit with one movement after double parking according to an exemplary embodiment of the present disclosure.

FIG. 4B illustrates an example of enabling a surrounding vehicle to exit with one movement after double parking according to an exemplary embodiment of the present disclosure. Referring to FIG. 4B when the autonomous vehicle 100 is blocking exiting of a surrounding vehicle 402, the autonomous vehicle 100 may be reversely moved to create a space for the surrounding vehicle 402 to exit. In this case, the surrounding vehicle 402 may be allowed to exit by only reversely controlling the autonomous vehicle 100 once without steering control, and thus the autonomous vehicle 100 be reversely controlled through autonomous driving control without remote driving control.

Figure 5:
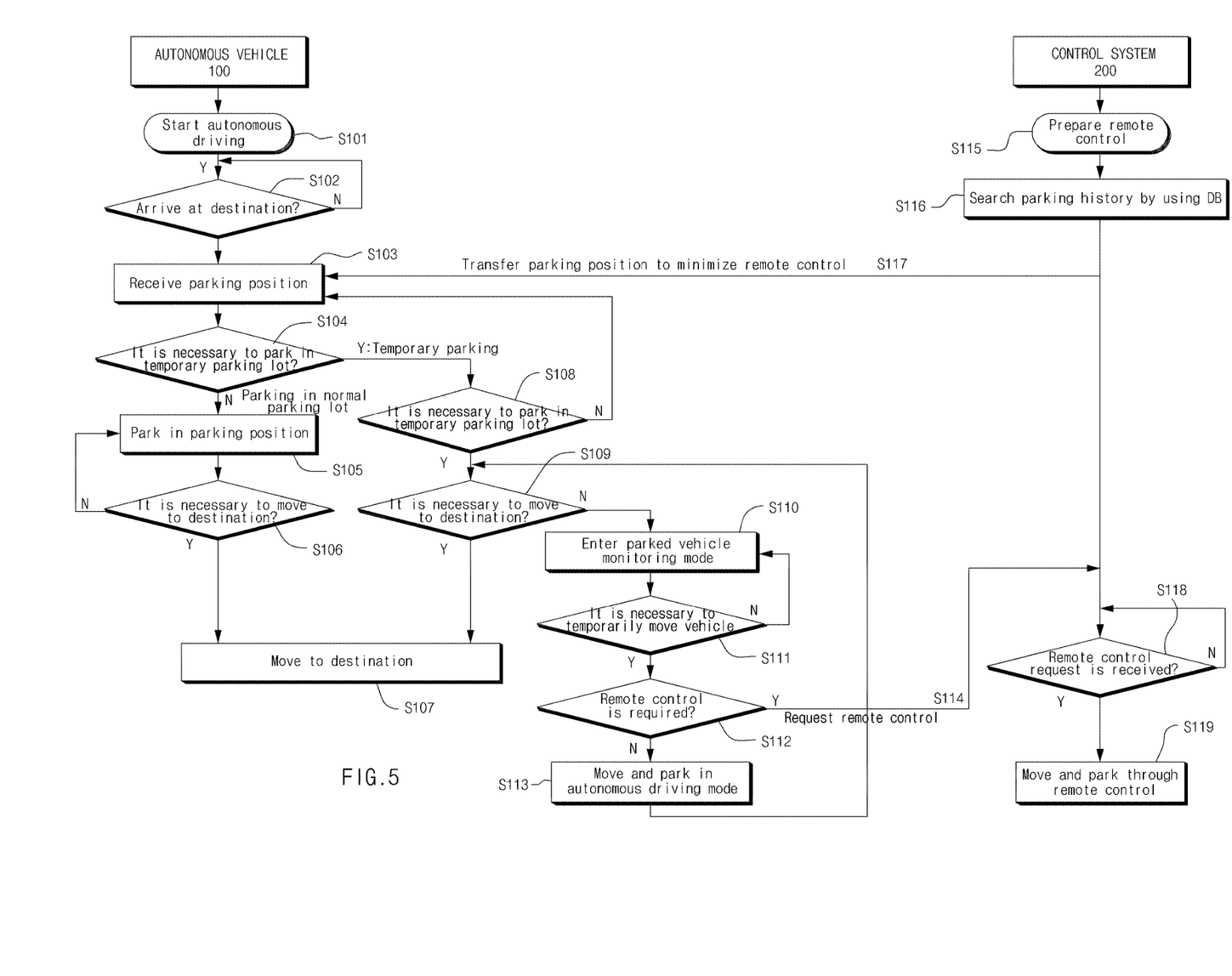
FIG. 5 illustrates a flowchart showing a remote control method after double parking of an autonomous vehicle according to an exemplary embodiment of the present disclosure.
Figure 6:
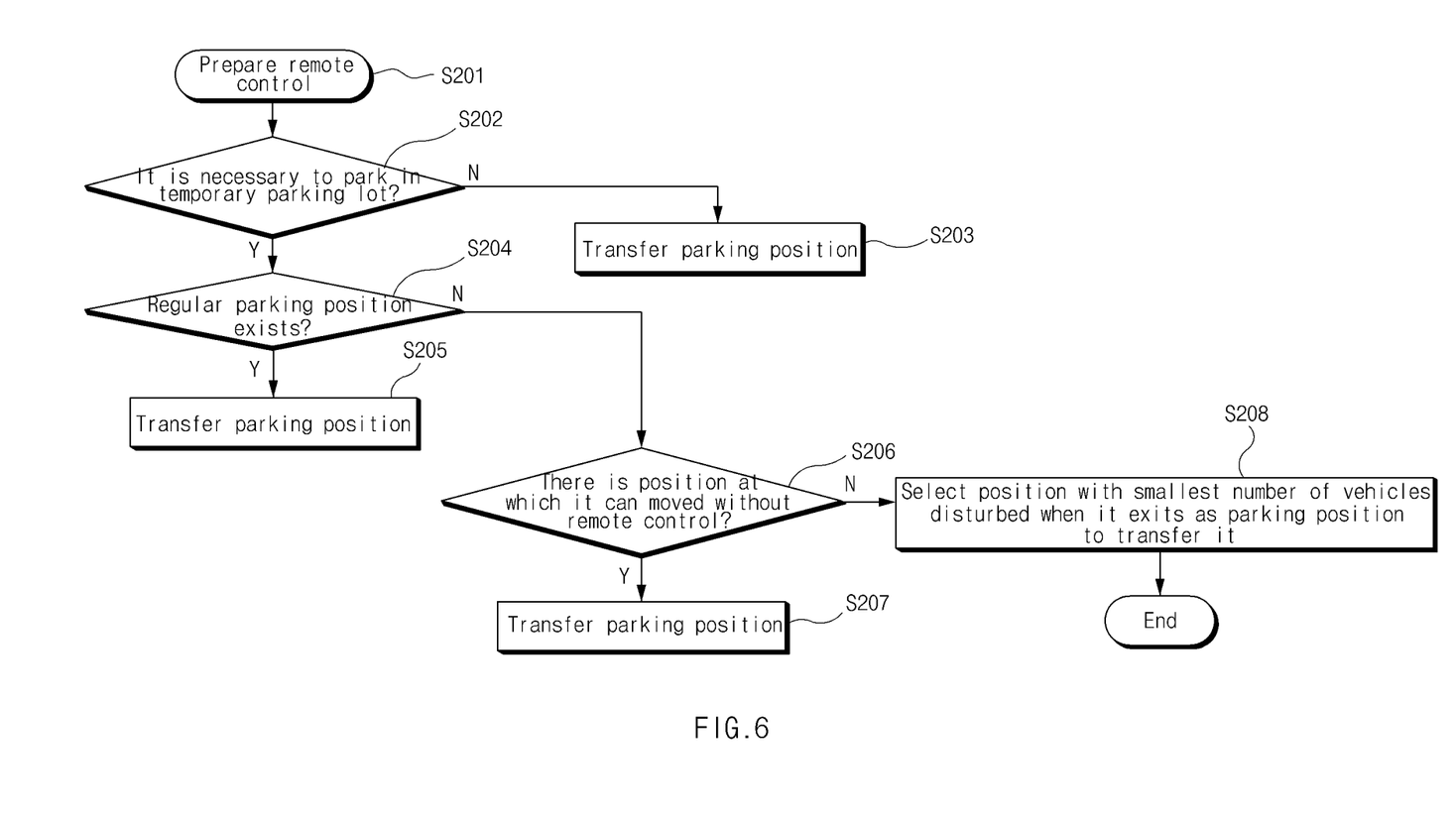
FIG. 6 illustrates a flowchart showing a method of searching for a parking position for minimizing remote control of an autonomous vehicle according to an exemplary embodiment of the present disclosure.

As such, according to the present disclosure, double parking is supported when there is insufficient parking space for an autonomous vehicle, and exit intention of a surrounding vehicle may be recognized and the autonomous vehicle may be temporarily moved to an autonomous driving mode or a remote driving mode by entering a surrounding vehicle detection mode after the double parking, thereby securing an exit space for the surrounding vehicle. Hereinafter, a control method for double parking of an autonomous vehicle and a remote control method after the double parking according to an exemplary embodiment of the present invention will be described in detail with reference to FIG. 5 and FIG. 6. FIG. 5 illustrates a flowchart showing a remote control method after double parking of an autonomous vehicle according to an exemplary embodiment of the present invention, and FIG. 6 illustrates a flowchart showing a method of searching for a parking position for minimizing remote control of an autonomous vehicle according to an exemplary embodiment of the present invention.

Hereinafter, it is assumed that the autonomous driving control apparatus 110 and the control system 200 of the autonomous vehicle 100 of FIG. 1 perform the processes of FIG. 5, and it is assumed that the control system 200 performs the processes of FIG. 6. In addition, in the description of FIG. 5 and FIG. 6, it may be understood that operations described as being performed by each device and system are controlled by a processor of each of the systems.

Referring to FIG. 5, the autonomous vehicle 100 starts autonomous driving (S101), and checks whether to arrive at a destination during the autonomous driving (S102).

When arriving at the destination, the autonomous vehicle 100 receives parking position information from the control system 200 (S103).

Meanwhile, the control system 200 may prepare remote control (S115) and then search a parking history by using a database (S116), and may select a parking position to minimize the remote control and transmit it to the autonomous vehicle 100 (S117).

It is determined whether it is necessary to park in a temporary parking lot (S104). In this case, the autonomous vehicle 100 may determine that it is necessary to park in a temporary parking lot when a parking space is insufficient in the parking position received from the control system 200.

When the autonomous vehicle 100 does not need to be parked in the temporary parking lot, it parks at the parking position received from the control system 200 (S105), and checks whether it is necessary to move to the destination after parking is completed (S106). Next, when it is necessary to move to the destination, the autonomous vehicle 100 controls movement to the destination (S107).

On the other hand, when it is necessary to park in the temporary parking lot in step S104, the autonomous vehicle 100 performs parking in the temporary parking lot, and checks whether parking in the temporary parking lot is completed (S108), and receives the parking location from the control system 200 again when the parking in the temporary parking lot is not completed and checks whether it is necessary to move to the destination when the parking in the temporary parking lot is completed (S109).

When it is necessary to move to the destination, the autonomous vehicle 100 controls movement to the destination (S107). On the other hand, when it is not necessary to move to the destination, i.e., when a parked state thereof is maintained, the autonomous vehicle 100 enters a parked vehicle monitoring mode (S110).

In this case, depending on the parked vehicle monitoring mode, which is a mode for selecting a vehicle that is prevented from exiting by the autonomous vehicle 100 from among previously parked surrounding vehicles after double parking of the autonomous vehicle 100 as a target vehicle to be monitored and monitoring the target vehicle to be monitored, it is possible to monitor whether movement of the target vehicle to be monitored occurs, a change in kinds of lamps (e.g., headlamps, emergency lights, and tail lights) of the target vehicle to be monitored when a door of the target vehicle to be monitored is opened such that a person gets in, and generation of a starting sound of the target vehicle to be monitored. In addition, in the parking vehicle monitoring mode, the autonomous vehicle 100 may receive information related to the movement of the target vehicle to be monitored from the control system 200.

The autonomous vehicle 100 determines whether it is necessary to temporarily move the autonomous vehicle to allow the target vehicle to be monitored during the parked vehicle monitoring mode (S111), and when it is determined that it is necessary to temporarily move it, determines whether remote control is necessary (S112). That is, it may be determined that the vehicle 100 does not need to be remotely controlled when the target vehicle to be monitored can be allowed to exit only by forward or backward control of the autonomous vehicle without excessive steering control, the target vehicle to be monitored can be allowed to exit only with one movement of the autonomous vehicle, and there is no driving history in the reverse direction and there is no risk of collision.

Accordingly, in the case where remote control is not required, the autonomous vehicle 100 may move the autonomous vehicle in an autonomous driving mode, and perform parking control again when the target vehicle to be monitored completely exit (S113).

Meanwhile, when it is determined that the remote control is required, the autonomous vehicle 100 requests the remote control to the control system 200 (S114). Next, the control system 200 determines whether a remote control request is received from the autonomous vehicle 100 every predetermined cycle (S118), when receiving the remote control request, moves the autonomous vehicle 100 through remote control, and when the target vehicle to be monitored completely exits, performs parking control again (S119).

As such, according to the present invention, double or temporary parking of autonomous vehicles may be supported, and after a surrounding vehicle that is prevented from exiting by the autonomous vehicle which is in a double or temporarily parked state is selected as a target vehicle to be monitored, the autonomous vehicle may move through autonomous driving control or remote driving control by determining movement of the target vehicle to be monitored when the target vehicle to be monitored exits. Accordingly, according to the present invention, it is possible to increase efficiency of the autonomous driving control system by actively responding to a previously parked vehicle even during double parking and securing an exit space when it exits.

Hereinafter, a method of searching for a parking position for minimizing remote control of an autonomous vehicle will be described in detail with reference to FIG. 6.

The control system 200 prepares for remote control (S201), and determines whether the autonomous vehicle 100 needs to be parked in a temporary parking lot upon reaching a destination thereof (S202).

When there is no need to park in the temporary parking lot, the control system 200 transfers a parking position of the current parking lot to the autonomous vehicle 100 (S203).

When it is necessary to park in the temporary parking lot, the control system 200 determines whether a regular parking position is stored in a database (S204), and when the regular parking position is stored, transfers the parking position to the autonomous vehicle 100 (S205).

On the other hand, the control system 200 determines whether there is a position at which it can moved without remote control when there is no regular parking position (S206).

When there is the position at which it can moved without remote control, the control system 200 transfers a corresponding parking position to the autonomous vehicle 100 (S207).

On the other hand, when there is no position at which it can moved without remote control, the control system 200 transfers the parking position to the autonomous vehicle 100 such that the autonomous vehicle 100 parks at a position with a smallest number of vehicles disturbed by the autonomous vehicle when exiting (S208).

As such, according to the present invention, energy and time for parking may be minimized by enabling temporary parking of an autonomous vehicle (e.g., double parking, parking in temporary parking lots, irregular parking, etc.).

In addition, according to the present invention, it is possible to enable a corresponding vehicle to exit by actively monitoring movement of other vehicles that are obstructed by the autonomous vehicle, which is the autonomous vehicle that has temporarily parked, and moving the autonomous vehicle through remote driving control or autonomous driving control when the corresponding vehicle exits, thereby increasing user satisfaction.

Figure 7:
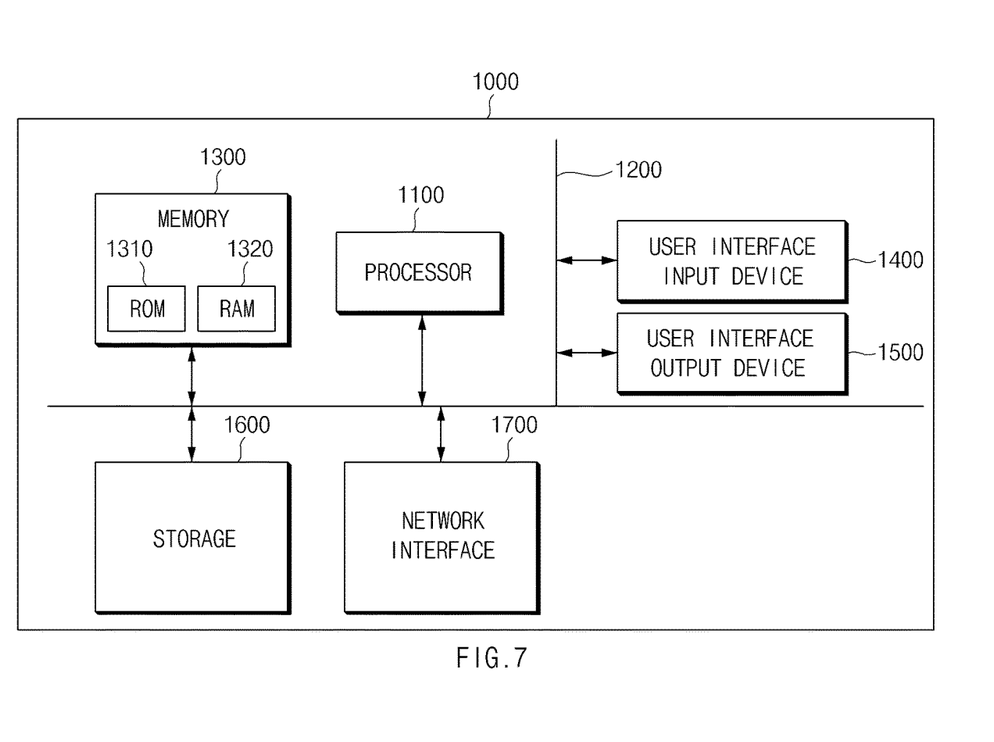
FIG. 7 illustrates a computing system according to an exemplary embodiment of the present disclosure.

FIG. 7 illustrates a computing system according to an exemplary embodiment of the present invention.

Referring to FIG. 7, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which the present invention pertains may make various modifications and variations without departing from the essential characteristics of the present invention.

Therefore, the exemplary embodiments disclosed in the present invention are not intended to limit the technical ideas of the present invention, but to explain them, and the scope of the technical ideas of the present invention is not limited by these exemplary embodiments. The protection range of the present invention should be interpreted by the claims below, and all technical ideas within the equivalent range should be interpreted as being included in the scope of the present invention.

What is claimed is:

1. An autonomous vehicle comprising:
   an autonomous driving control apparatus configured to include a processor that enters a surrounding vehicle monitoring mode when an autonomous vehicle temporarily parking, selects a surrounding vehicle that is likely to be prevented from exiting by the autonomous vehicle as a target vehicle to be monitored, and temporarily moves the autonomous vehicle through autonomous driving control or remote driving control to secure an exit space for the target vehicle to be monitored when it exits.

2. The autonomous vehicle of claim 1, wherein
   the processor determines whether temporary parking is required when arriving at a destination.

3. The autonomous vehicle of claim 2, wherein
   the processor performs the temporary parking at a parking position received from a control system when the temporary parking is required.

4. The autonomous vehicle of claim 1, wherein
   the processor, when entering the surrounding vehicle monitoring mode,
   determines that temporary movement of the autonomous vehicle is necessary for the target vehicle to be monitored to exit, at least one or more of cases in which the target vehicle to be monitored is moving, a kind of door of the target vehicle to be monitored is opened, a change in a kind of lamp of the target vehicle to be monitored occurs, ignition of the target vehicle to be monitored is turned on, and notification of movement of the target vehicle to be monitored is received from the control system.

5. The autonomous vehicle of claim 1, wherein
the processor, temporarily moves the autonomous vehicle in an autonomous driving mode, at least one or more of cases in which the autonomous vehicle is temporarily moved by forward or reverse control, the exit space for the target vehicle to be monitored is securable with one movement, a section in which the autonomous vehicle is temporarily moved has no driving history in a reverse direction, and there is no risk of collision in the section where the vehicle is temporarily moved.

6. The autonomous vehicle of claim 1, wherein
the processor requests remote driving control to a control system for temporary movement of the autonomous vehicle.

7. The autonomous vehicle of claim 1, wherein
the temporary parking includes parking in a temporary parking lot, or parking that obstructs exit of surrounding vehicles even when parked in a general parking lot.

8. system. comprising:
the autonomous vehicle of claim 1; and
a control system comprising:
a processor configured to select a parking position for minimizing remote control for parking to transfer it to an autonomous vehicle when the autonomous vehicle arrives at a destination, and to perform remote control from the autonomous vehicle when receiving a request for parking control through remote control from the autonomous vehicle.

9. The control system of claim 8, wherein
the processor determines whether temporary parking of the autonomous vehicle is required.

10. The control system of claim 8, wherein
the processor searches for a parking history based on a database and preferentially selects a regular parking position when the autonomous vehicle is temporarily parked.

11. The control system of claim 8, wherein
the processor preferentially selects a position where the autonomous vehicle is movable in an autonomous driving mode without remote control as a parking position.

12. The control system of claim 11, wherein
the processor determines that the autonomous vehicle is movable in the autonomous driving mode without remote control at least one or more of cases where it is possible to secure an exit space for a vehicle surrounding the autonomous vehicle by forward or backward control of the autonomous vehicle, it is possible to secure an exit space for a vehicle surrounding the autonomous vehicle with one movement of the autonomous vehicle, and there is no risk of an accident in a moving section of the autonomous vehicle.

13. The control system of claim 8, wherein
the processor preferentially selects a position with a minimum number of surrounding vehicles that are prevented from exiting by the autonomous vehicle as a parking position.

14. The control system of claim 8, wherein
the processor monitors movement of vehicles surrounding the autonomous vehicle after the autonomous vehicle is temporarily parked, and when movement information of the vehicles surrounding the autonomous vehicle is detected, transmits it to the autonomous vehicle.

15. A remote control method for an autonomous vehicle, comprising:
entering a surrounding vehicle monitoring mode when an autonomous vehicle is temporarily parked;
selecting a surrounding vehicle that is likely to be prevented from exiting by the autonomous vehicle as a target vehicle to be monitored; and
securing an exit space for the target vehicle to be monitored by temporarily moving the autonomous vehicle through autonomous driving control or remote driving control when it exits.

16. The remote control method of claim 15, further comprising receiving a parking position from a control system and performing temporary parking at the parking position when the autonomous vehicle is temporarily parked.

17. The remote control method of claim 16, wherein
the securing of the exit space for the target vehicle to be monitored includes
temporarily moving the autonomous vehicle in an autonomous driving mode, at least one or more of cases in which the autonomous vehicle is temporarily moved by forward or reverse control, the exit space for the target vehicle to be monitored is securable with one movement, a section in which the autonomous vehicle is temporarily moved has no driving history in a reverse direction, and there is no risk of collision in the section where the vehicle is temporarily moved.

18. The remote control method of claim 16, wherein
the securing of the exit space for the target vehicle to be monitored includes
requesting remote driving control to the control system for temporary movement of the autonomous vehicle; and
receiving a remote driving command and a remote driving path from the control system to perform following and control.

19. The remote control method of claim 16, wherein
the temporary parking includes parking in a temporary parking lot, or parking that obstructs exit of surrounding vehicles even when parked in a general parking lot.

20. The remote control method of claim 15, wherein the securing of the exit space for the target vehicle to be monitored includes when entering the surrounding vehicle monitoring mode, determining that temporary movement of the autonomous vehicle is necessary for the target vehicle to be monitored to exit, at least one or more of cases in which the target vehicle to be monitored is moving, a kind of door of the target vehicle to be monitored is opened, a change in a kind of lamp of the target vehicle to be monitored occurs, ignition of the target vehicle to be monitored is turned on, and notification of movement of the target vehicle to be monitored is received from the control system.

* * * * *